(12) United States Patent
Yeh

(10) Patent No.: US 6,499,309 B1
(45) Date of Patent: Dec. 31, 2002

(54) WATER SUPPLY SYSTEM BY CONDENSING AIR HUMIDITY

(75) Inventor: Chao-Hsiung Yeh, Taipei (TW)

(73) Assignee: Lucky Star Enterprise & Co., Ltd., Taipei (TW)

( * ) Notice: Subject to any disclaimer, the term of this patent is extended or adjusted under 35 U.S.C. 154(b) by 0 days.

(21) Appl. No.: 09/984,098

(22) Filed: Oct. 29, 2001

(51) Int. Cl.[7] ............................ F25B 27/00; F25D 21/14
(52) U.S. Cl. .......................................... 62/235.1; 62/291
(58) Field of Search .................... 62/291, 285, 288, 62/235.1

(56) References Cited

U.S. PATENT DOCUMENTS

| | | | | |
|---|---|---|---|---|
| 2,222,241 A | * | 11/1940 | Philipp ...................... | 236/44 R |
| 2,630,691 A | * | 3/1953 | Harris et al. ................ | 165/122 |
| 2,747,383 A | * | 5/1956 | Schlumbohn ................ | 62/279 |
| 3,035,418 A | * | 5/1962 | Wright ........................ | 62/173 |
| 4,255,937 A | * | 3/1981 | Ehrlich ........................ | 62/264 |
| 4,712,382 A | * | 12/1987 | LeClear ...................... | 141/198 |
| 4,882,911 A | * | 11/1989 | Immel ...................... | 261/119.1 |
| 4,953,364 A | * | 9/1990 | Lee ............................ | 415/220 |

* cited by examiner

Primary Examiner—William E. Tapolcai
(74) Attorney, Agent, or Firm—Rosenberg, Klein & Lee

(57) ABSTRACT

A water supply system for supplying water by condensing air humidity is disclosed. The water supply system is provided with a housing adapted to be mounted on a building. An air humidity condensing system is mounted in the housing to condense air humidity to water. A water collector is arranged below the air humidity condensing system for collecting the water collected by the air humidity condensing system. A water-storage tank is used to storage the water and then supply the water via distributing ducts to the building. A solar collector panel is further supported over the housing to supply electric energy by converting solar energy.

2 Claims, 6 Drawing Sheets

WATER SUPPLY SYSTEM BY CONDENSING AIR HUMIDITY

BACKGROUND OF THE INVENTION

1. Field of the Invention

The present invention relates to an energy supply system, and more particularly to a water supply system by condensing air humidity.

2. Description of the Prior Art

There are always different amounts of humidity in the air. An overly high amount of humidity in the air would often result in moldy living environment and/or rusty appliances and even cause discomfort to some people. Thus, dehumidifiers are frequently used in housing and other places to remove humidity from the air.

Also, many areas on the earth, such as in the deserts, have difficulties in obtaining water resources, particularly pure water. Lack of water prevents these dry areas from improved hygienic conditions and makes them origins of various diseases. However, analyses indicate that these dry areas actually have heavy air humidity even higher than that in the Frigid Zone, the Torrid Zone or the temperate zones. Therefore, a system that taking advantage of rich humidity in the air to supply water for living would be very helpful in solving the water shortage problem in some dry areas.

On the other hand, most dry areas have strong sunshine in the daytime. Thus, sunlight becomes the best energy resource of these dry areas. It would be highly appreciated if the water resource from the rich air humidity and the solar energy resource were fully utilized in these dry areas.

It is therefore tried by the inventor to develop a water supply system by condensing air humidity that not only utilizes the air rich in humidity but also the solar energy to ensure sufficient supply of water for living in dry areas.

SUMMARY OF THE INVENTION

A primary object of the present invention is to provide a water supply system by condensing air humidity. The water supply system is adapted to be mounted on a roof of a building to supply water for basic living to users in that building.

Another object of the present invention is to provide a water supply system by condensing air humidity, in which a solar collector panel is included to convert solar energy into electric energy that provides power needed by the water supply system to function normally.

To achieve the above objects, in accordance with the present invention, the water supply system is provided with a housing adapted to be mounted on a building. An air-suction device is mounted on the top end of the housing for providing an air flow into the housing. An air humidity condensing system is mounted in the housing to condense air humidity to water. A water collector is arranged below the air humidity condensing system for collecting the water collected by the air humidity condensing system. A water-storage tank is further used to storage the water and then supply the water via distributing ducts to the building. A solar collector panel is further supported over the housing to supply electric energy by converting solar energy.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
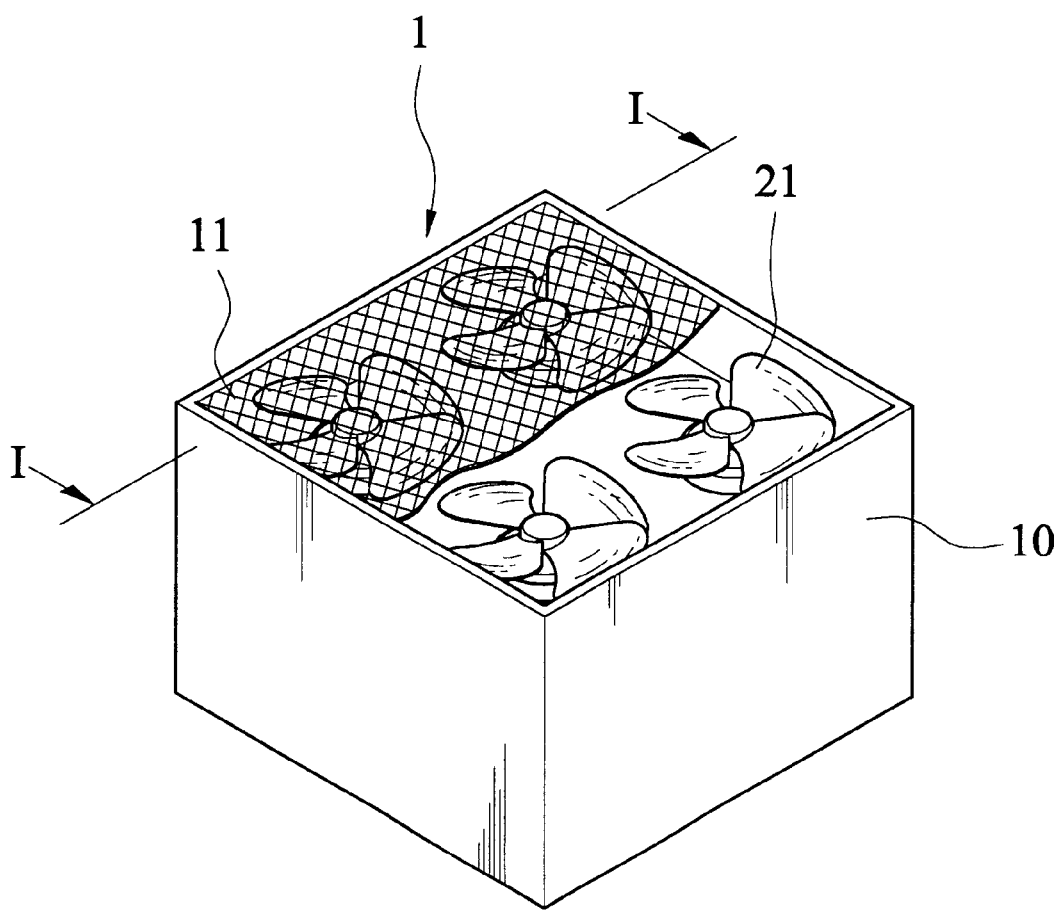
FIG. 1 is a perspective view of a water supply system by condensing air humidity according to a first embodiment of the present invention.
Figure 2:
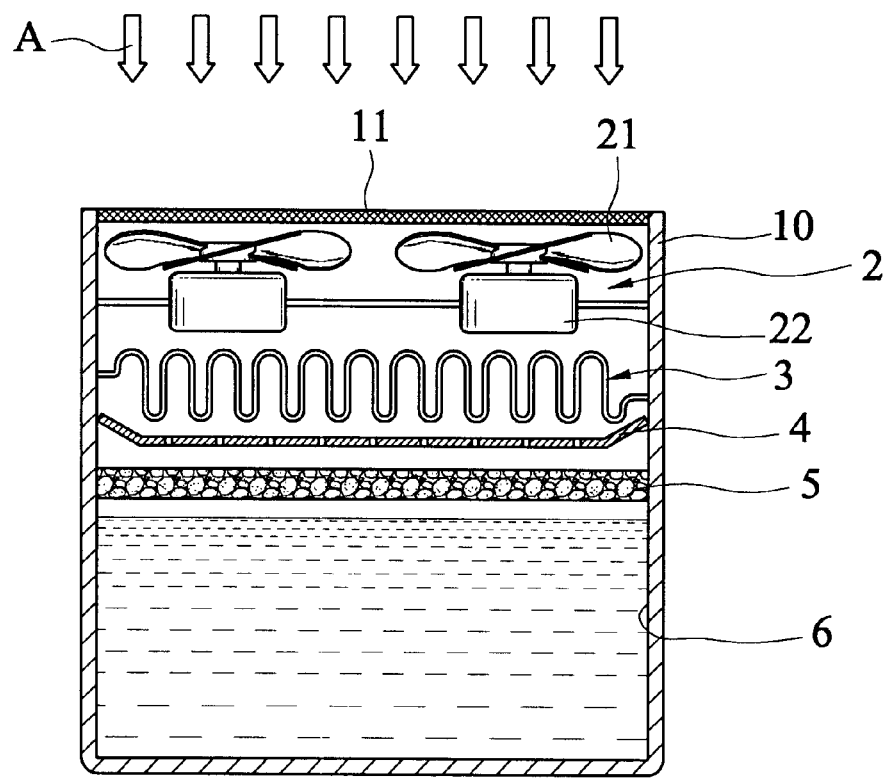
FIG. 2 is a sectional view taken along line I—I of FIG. 1.

Please refer to FIG. 1 that is a perspective view of a water supply system by condensing air humidity according to a first embodiment of the present invention. For simplicity, the water supply system by condensing air humidity will be briefly referred to as "the water supply system" and generally denoted by reference numeral 1. FIG. 2 is a cross sectional view taken along line I—I of FIG. 1.

As shown, the water supply system 1 mainly includes a housing 10 having an air-suction device 2 provided in an upper part thereof for drawing in humidity-rich air denoted by reference character A. The air-suction device 2 includes at least one fan 21 associated with a driving motor 22. The fan 21 and the driving motor 22 are arranged in the housing 10. A filter net 11 is preferably covered over a top of the housing 10 to filter external articles, such as leaves.

An air humidity condensing system 3 is mounted in the housing 10 below the air-suction device 2 for condensing humidity in the drawn-in air to water. The air humidity condensing system 3 may be a conventional dehumidifier or a humidity condensing installation designed for the present invention for using outdoors.

Figure 3:
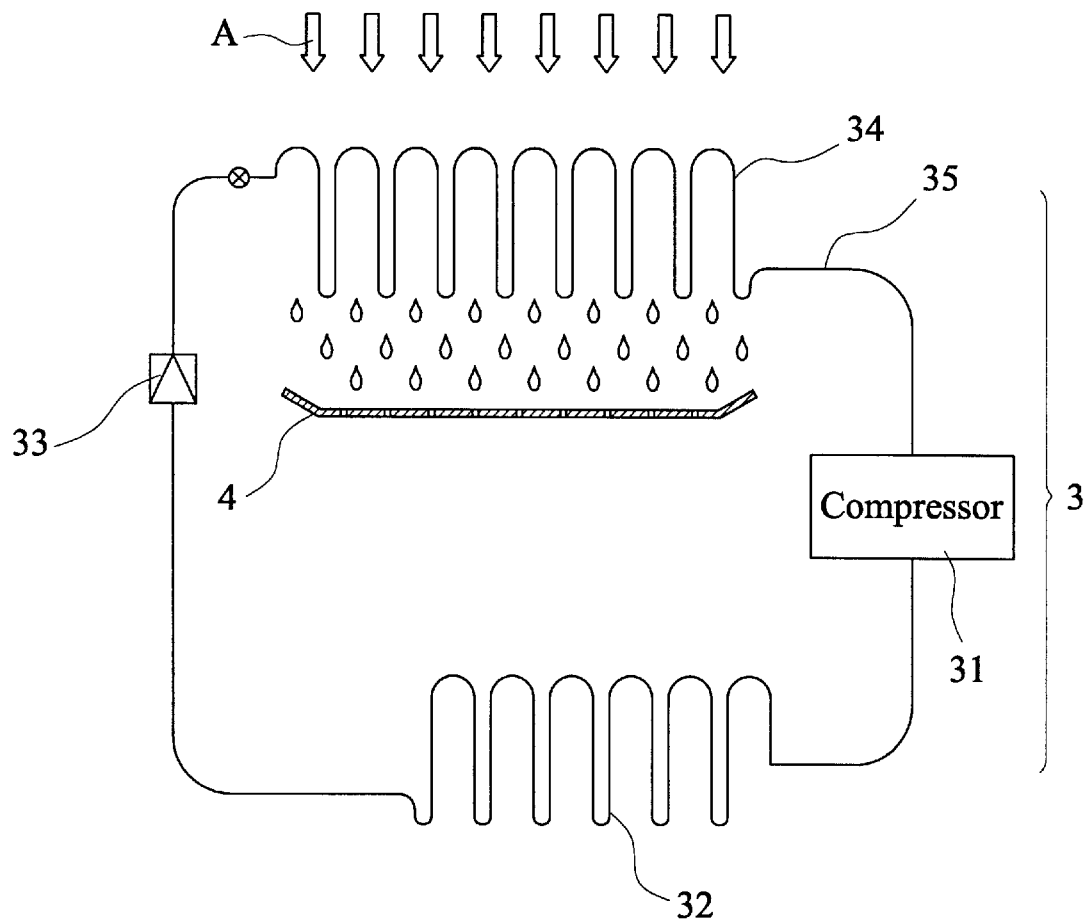
FIG. 3 is a schematic view of an air humidity condensing system included in the present invention.

FIG. 3 schematically shows an air humidity condensing system employed in the present invention. The air humidity condensing system 3 typically includes a compressor 31, a condenser 32, a control valve 33, and an evaporator 34 connected to the compressor 31 via a refrigerant pipe 35.

Humidity-rich air A drawn into the housing 10 by the air-suction device 2 is guided into the air humidity condensing system 3, at where humidity in the air is condensed to water droplets that attach to the evaporator 34. When the droplets attached to the evaporator 34 accumulate to a considerable amount, they form larger drops that finally fall into a water collector 4 provided below the air humidity condensing system 3. A filtrating means 5 is provided in the housing 10 below the water collector 4 to strain articles from water collected in the water collector 4, so that purified water is produced.

The purified water coming out of the filtrating means 5 either directly falls into or is guided via a duct (not shown) to a water storage tank 6 and is stored therein for use.

Figure 4:
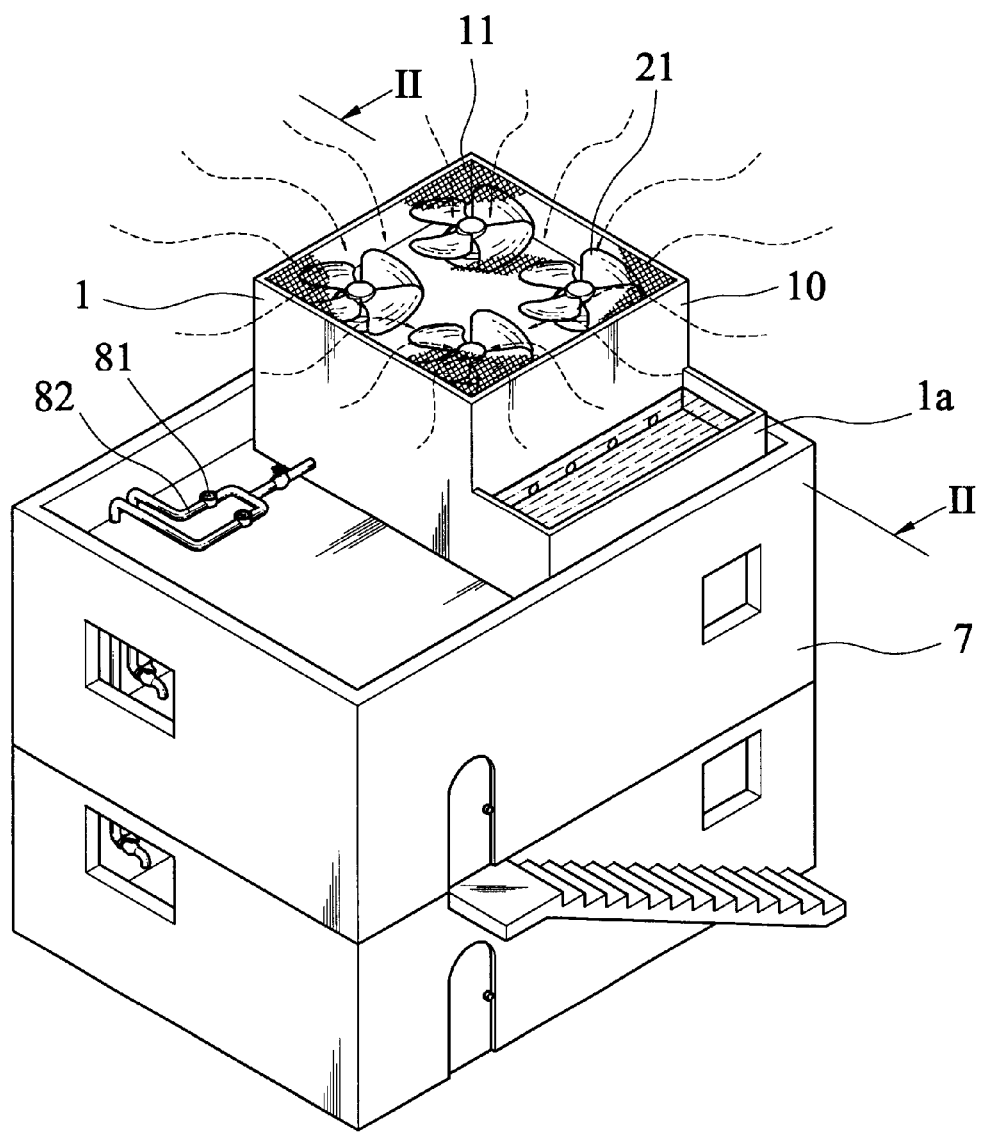
FIG. 4 is a perspective view showing a water supply system by condensing air humidity according to the present invention is mounted on a roof of a building.
Figure 5:
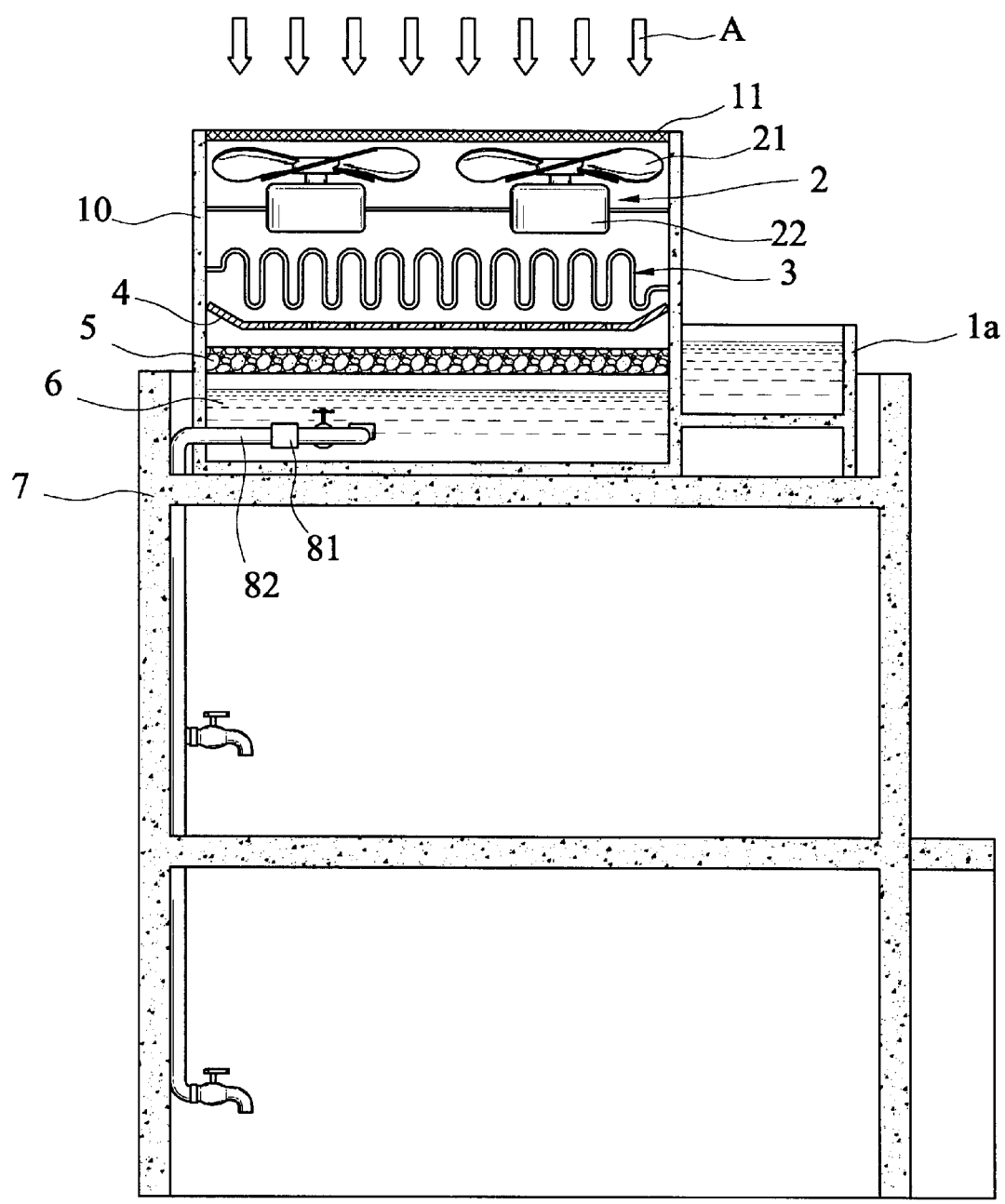
FIG. 5 is a sectional view taken along line II—II of FIG. 4.

FIG. 4 is a perspective view showing the water supply system 1 of the present invention may be mounted on a roof of a building 7, and FIG. 5 is a sectional view taken along line II—II of FIG. 4. As can be seen from FIGS. 4 and 5, purified water collected by way of the present invention and stored in the water-storage tank 6 is supplied to individual houses through distributing ducts 82, on each of which a water gauge 81 is mounted, connected to the water-storage tank 6.

Moreover, to well utilize available water resource, a water sump la may be provided on a side wall of the housing 10 of the water supply system 1 for collecting natural rainwater. The water sump 1a is provided with a duct led to the water collector 4, so that both natural rainwater and water obtained through condensing humidity in the drawn-in air may be utilized to supply water for living.

Figure 6:
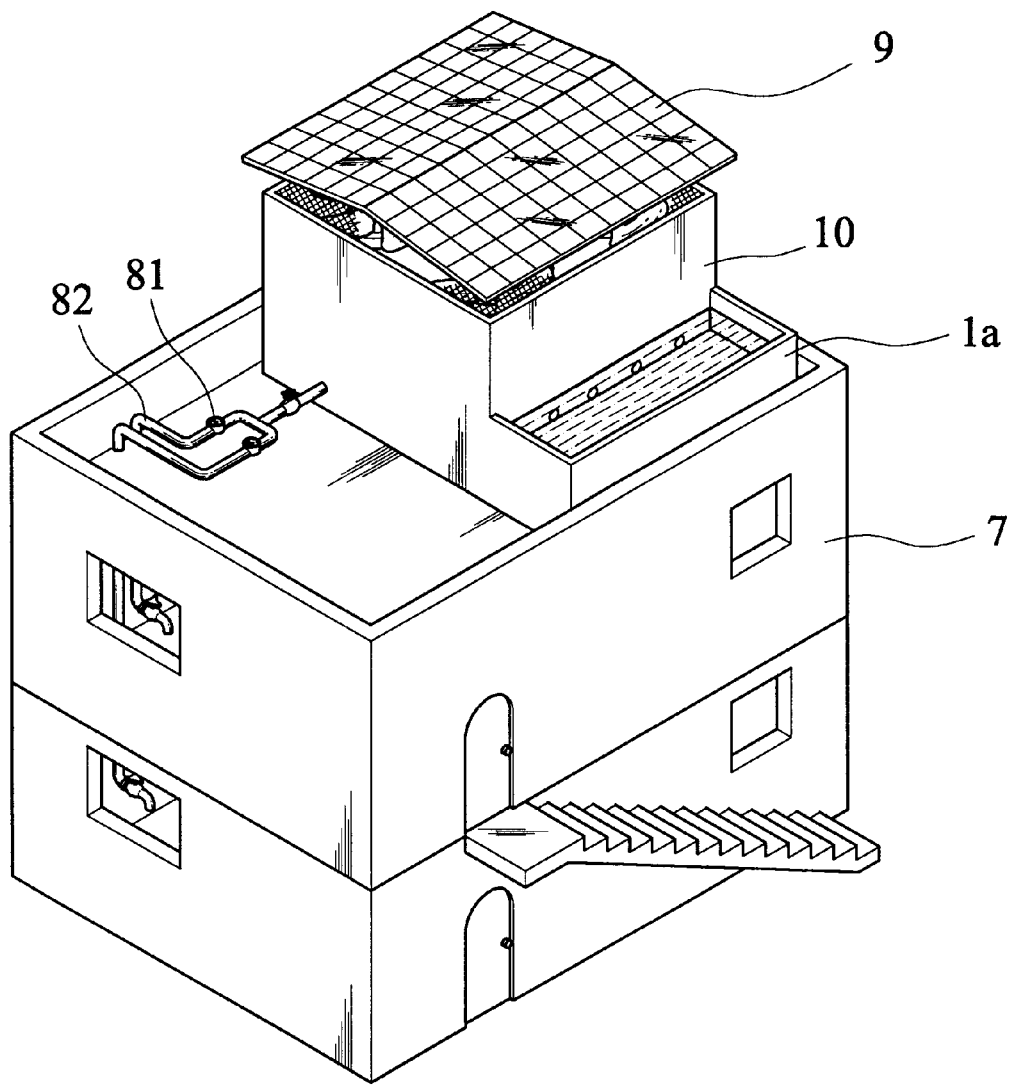
FIG. 6 is a perspective view showing a water supply system by condensing air humidity according to a second embodiment of the present invention is mounted on a roof of a building, wherein a solar collector panel is mounted over the water supply system.

FIG. 6 shows a water supply system 1 according to a second embodiment of the present invention is mounted on a roof of a building 7. In this second embodiment, a solar collector panel 9 is mounted over the housing 10. In the daytime, the solar collector panel 9 absorbs energy from sunlight and converts the absorbed solar energy into electric energy for use by the water supply system 1 to function normally. Alternatively, the absorbed solar energy may be stored in an energy storage unit, such as a rechargeable battery (not shown), and released at night or when the water supply system 1 is to be actuated for condensing air humidity. Since the conversion of solar energy into electric energy and the storage of electric energy all can be achieved through skills known in the art, they are not discussed herein.

The solar collector panel 9 may also serve as a shielding device to prevent the water supply system 1 from direct exposure to sunlight and rain.

With the above arrangements, the water supply system of the present invention effectively and efficiently utilizes natural water resources contained in the atmosphere to supply water needed in daily life and is therefore highly valuable and practical for use.

Although the present invention has been described with respect to the preferred embodiments, it is contemplated that a variety of modifications, variations and substitutions may be done without departing from the scope of the present invention that is intended to be defined by the appended claims.

What is claimed is:

1. A water supply system comprising:
   a housing having an open top end and being disposed external to a building;
   an air-suction device mounted in the housing for drawing a flow of humidity-rich ambient air into the housing;
   an air humidity condensing system mounted in the housing below the air-suction device for condensing the humidity in the drawn-in-air to water drops;
   a water collector mounted in the housing below the humidity-condensing system for collecting the condensed water drops;
   a water sump mounted to an external surface of the housing for collecting rainwater therein, the water sump being coupled in fluid communication to the water collector;
   a water-storage tank provided in the housing for storing the water collected by the water collector and the water sump; and,
   a water filter disposed between the water collector and the water-storage talk for filtering both condensed water and rainwater.

2. The water supply system as claimed in claim 1, further comprising a solar collector panel supported in overlaying spaced relationship above open top end of the housing for supplying an electric energy to the water supply system and shielding the open top end from direct exposure to sunlight and rain.

* * * * *